June 18, 1968   D. R. MITCHELL   3,388,599
PRESSURE GAGE
Filed Sept. 11, 1964
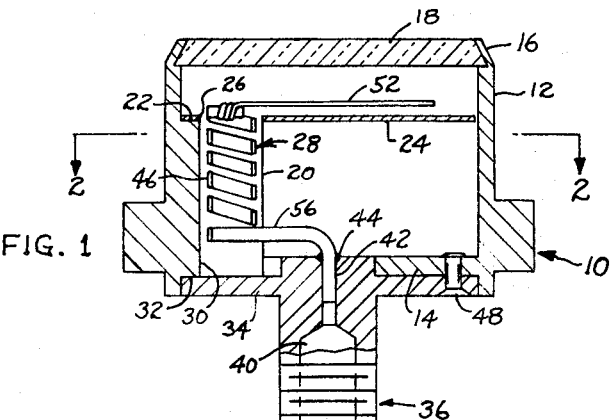
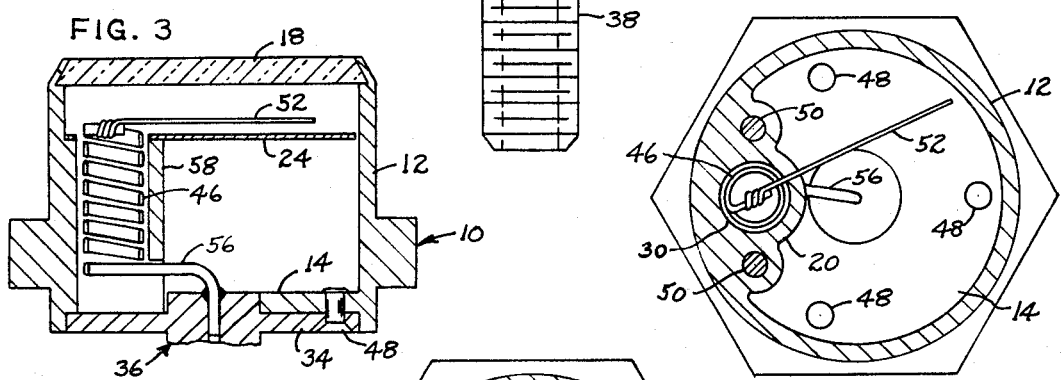
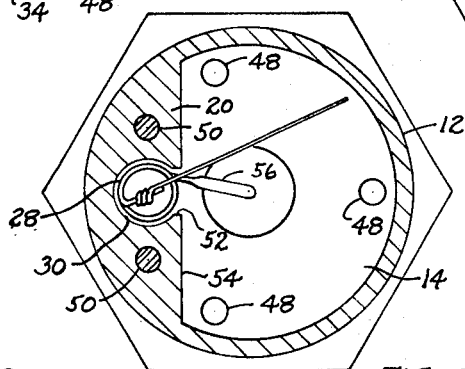
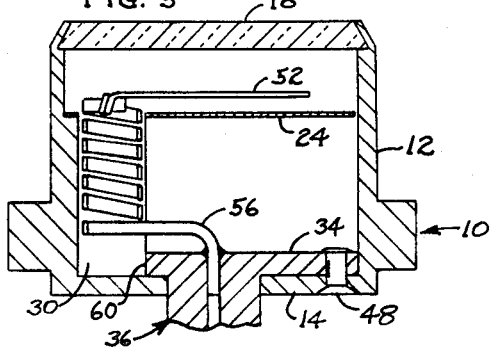
INVENTOR.
DONALD R. MITCHELL
BY
JOHN E. McRAE

United States Patent Office 3,388,599
Patented June 18, 1968

3,388,599
PRESSURE GAGE
Donald Robert Mitchell, Glendora, Calif., assignor to American Radiator & Standard Sanitary Corporation, New York, N.Y., a corporation of Delaware
Filed Sept. 11, 1964, Ser. No. 395,770
1 Claim. (Cl. 73—418)

This invention relates to pressure gages, and particularly gages employing helical Bourdon tubes in direct connection with indicating arms.

Helical Bourdon tube gages of the above-mentioned type sometimes includes wall structures for stabilizing the helical coil against vibrational effects. Heretofore such stabilizing wall structures have been formed separately from the gage housing. The stabilizing wall structures were necessarily precision pieces because of their own tolerances and tolerances in the housing component. The cost of the gage was therefore relatively high.

One object of the present invention is to provide a helical Bourdon tube gage wherein the helical Bourdon tube is stabilized against vibrational disturbances by means of a stabilizer wall or boss which is formed integrally with the gage housing, thereby simplifying the gage construction and making it more rigid.

It is another object to provide a helical Bourdon pressure gage wherein the number of component parts is less than in prior art gages.

A further object is to provide a helical Bourdon tube pressure gage wherein comparatively few assembly operations are required to operatively connect the component parts together.

A general object is to provide a helical Bourdon tube pressure gage having desired features of low cost and long service life.

Other objects of this invention will appear from the following description and appended claim, reference being had to the accompanying drawing forming a part of this specification wherein like reference characters designate corresponding parts in the several views.

In the drawing:

FIGURE 1 is a longitudinal sectional view of one embodiment of the invention;

FIG. 2 is a sectional view taken substantially on line 2—2 of FIG. 1;

FIG. 3 is a longitudinal sectional view of another embodiment of the invention;

FIG. 4 is a sectional view taken through FIG. 3 in the same direction as FIG. 2;

FIG. 5 is a longitudinal sectional view of another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 of the drawings, there is shown a helical Bourdon tube pressure gage comprising a tubular housing 10 having a tubular side wall 12 and an end wall or flange 14 at its lower end. The upper end portion 16 of the tubular side wall is of reduced thickness and is stacked onto the bevelled edge of a viewing window 18.

Internally the housing is formed with a boss 20 which as shown in FIG. 2 is of generally segmented configuration. As shown in FIG. 1, the boss terminates below the viewing window 18 to form a shoulder 22 for mounting a fixed dial plate 24. Dial plate is of circular outline so as to conform with the internal diameter of the tubular housing wall 12; however it is provided with a small circular opening 26 which permits the uppermost convolution of a helical Bourdon tube 28 to project above it. Screws 50 are threaded into tapped holes in boss 20 to retain the dial plate in position.

As shown in FIG. 2, boss 20 is provided with a generally cylindrical cavity 30. As shown in FIG. 1, the cavity extends downwardly from the aforementioned shoulder 22 to the bottom face 32 of housing 10. Face 32 receives the flange 34 of a pressure-admitting fitting generally designated by numeral 36. Securement of the fitting to housing 10 may be effected by three rivets 48. Tubular portion 38 of the fitting is extremely threaded and internally bored to provide a passage 40 which communicates with the downturned end portion 42 of the Bourdon tube 28.

Preferably the Bourdon tube is formed into its illustrated helical configuration and is then assembled to the fitting 36 before connection of the fitting with housing 10. The Bourdon tube may be affixed to the fitting by silver brazing at 44. With Bourdon tube 28 affixed to fitting 36 the assembly can be inserted axially upwardly into the housing 10 with helical coil 46 sliding upwardly into the cavity 30 of boss 20. Thereafter the fitting can be affixed to housing 10 by three spaced rivets 48.

With fitting 36 affixed to housing 10 dial plate 24 can be positioned on the aforementioned shoulder 22 of boss 20 and secured thereto by a pair of screws 50 which thread into tapped openings in the boss. The indicator arm 52 can then be affixed to the uppermost convolution of the Bourbon tube 28, as by any suitable adhesive. The indicator arm is preferably a simple length of straight wire having a coiled end portion which fits around the end portion of the Bourdon tube.

In service this gage may be subjected to considerable vibration and shock such that helical coil 46 of the Bourdon tube may have a tendency to waiver or vibrate in lateral directions. The illustrated gage uses a helical Bourdon coil having five convolutions. However in practice the coil can have a longer axial dimension and can include more convolutions, as for example eight or nine. Therefore the coil may have a comparatively long axial dimension in relation to its diameter such that vibrational conditions can have a decided tendency to vibrate the coil and the attached indicator arm 52. In the illustrated arrangement the coil is stabilized against such vibration by the boss 20, and particularly by the cylindrical surface provided by cavity 30 in the boss.

As shown in FIG. 2, boss 20 is provided with an opening 52 communicating with the cylindrical cavity 30. Opening 52 may extend the full axial dimension of boss 20, and is for the purpose of accommodating the laterally extending portion 56 of the Bourdon tube during the period when fitting 36 and Bourdon tube 28 are being assembled into housing 10.

As previously noted boss 20 is formed integrally with housing 10. The cavity 30 is therefore economically formed as part of the operation of forming the housing. As a result the manufacturing cost and assembly cost for a special part are avoided. Additionally, the gage is made more rigid and less susceptible to damage by the extreme shock conditions which are sometimes encountered during service. Preferably housing 10, with its integral boss 20, is formed as a die-cast aluminum component. Fitting 36 may be formed of stainless steel. The Bourdon tube may be formed of Inconel alloy.

FIGS. 3 and 4 illustrate a gage which is similar to the gage of FIG. 1, except that boss 20 provides a cavity 30 which completely surrounds coil 46 of the Bourdon tube. Thus, in the FIG. 3 embodiment boss 20 is provided with a wall portion 58 which occupies the space defined by opening 52 in the FIG. 2 embodiment. As shown best in FIG. 3, wall portion 58 terminates above the laterally extending portion 56 of the Bourdon tube to permit assembly of the tube and fitting 36 into housing 10.

The embodiment shown in FIG. 5 is in many respects similar to the embodiment of FIG. 1. However in the FIG. 5 embodiment wall 14 of housing 10 is positioned below flange 34 of fitting 36. Flange 34 is cut away along line 60 to clear boss 20 of housing 10. In assembling the gage, fitting 36 is inserted downwardly into housing 10 and then riveted with rivets 48. Thereafter dial plate 24 is mounted on shoulder 22, and indicator arm 52 is affixed to the Bourdon coil.

All forms of the invention utilize a coil-stabilizer boss 20 which is integral with housing 10.

What is claimed:

1. A pressure gage comprising a one-piece die-cast housing having a tubular side wall, an end wall extending inwardly from said side wall at one end thereof to form an end face for the housing, and a hollow boss formed integrally with said side wall; said boss defining a cylindrically contoured cavity extending parallel to, but offset from the housing axis; a one-piece fitting comprising a flange portion positioned flatwise against the housing end face and rigidly affixed thereto, and a tubular portion extending outwardly from said flange portion in alignment with the housing axis; a helical Bourdon tube having a helical coil disposed within the cylindrical cavity defined by the boss, one end portion of said tube terminating within the outline of the opening in said boss, the other end having a hollow anchoring portion extending from the coil into the fitting whereby pressure within the fitting is applied to the interior of the coil to unwind same about its axis; a view window disposed in the end of the housing remote from the fitting; the aforementioned boss terminating inwardly of said window to define a shoulder; a dial plate disposed on said shoulder and secured thereto; and an indicator arm affixed to said one end portion of the helical coil to overlie the dial plate and move thereacross during winding and unwinding movements of the coil; the interior wall surface defined by the cavity being located adjacent the outer surfaces of the coil whereby to constitute means for stabilizing the coil against vibrational movements crosswise of its axis; said hollow boss being completely closed about its periphery for substantially its entire axial dimension whereby the interior cavity wall surface completely surrounds the coil.

References Cited

UNITED STATES PATENTS 2,929,249  3/1960  Lindsay _____ 73—418

DAVID SCHONBERG, *Primary Examiner.*

D. O. WOODIEL, *Assistant Examiner.*